(12) United States Patent
Rozenboim

(10) Patent No.: US 11,444,804 B2
(45) Date of Patent: Sep. 13, 2022

(54) SYSTEM AND METHOD FOR PREVENTING SWITCH LOOPS IN LAYER-2 NETWORKS

(71) Applicant: ORACLE INTERNATIONAL CORPORATION, Redwood Shores, CA (US)

(72) Inventor: Leonid Rozenboim, Bellevue, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 73 days.

(21) Appl. No.: 16/868,368

(22) Filed: May 6, 2020

(65) Prior Publication Data

US 2021/0160099 A1 May 27, 2021

Related U.S. Application Data

(60) Provisional application No. 62/938,798, filed on Nov. 21, 2019.

(51) Int. Cl.
*H04L 12/437* (2006.01)
*H04L 12/46* (2006.01)
(Continued)

(52) U.S. Cl.
CPC .......... *H04L 12/437* (2013.01); *H04L 12/462* (2013.01); *H04L 12/4675* (2013.01);
(Continued)

(58) Field of Classification Search
CPC . H04L 12/462; H04L 12/437; H04L 12/4675; H04L 45/16
See application file for complete search history.

(56) References Cited

U.S. PATENT DOCUMENTS

| 5,267,238 A | 11/1993 | Yano et al. |
| 6,628,624 B1 * | 9/2003 | Mahajan .............. H04L 12/462 370/252 |

(Continued)

OTHER PUBLICATIONS

Cisco, "High-Availability Seamless Redundancy in the Factory Network Design Guide", Sep. 1, 2020, retrieved from https://www.cisco.com/c/en/us/td/docs/solutions/Verticals/Machines/HSR/ConnMach-HSR/ConnMach-HSR.html, 22 pages.

(Continued)

*Primary Examiner* — Min Jung
(74) *Attorney, Agent, or Firm* — Tucker Ellis LLP

(57) ABSTRACT

Described herein are systems and methods for preventing switch loops in a layer 2 network. A method can provide, at a computer including a microprocessor, two or more virtual local area networks (VLANs), each VLAN comprising a number of bridges, a plurality of end nodes connected to the two or more VLANs via a plurality of network interface cards (NICs). The method can connect two of the plurality of nodes to two of the VLANs via two or more tunnels. The method can receive a first instance of a broadcast packet at a bridge of a VLAN, and then receive a second instance of the broadcast packet is the bridge of the VLAN. Upon the second instance of the broadcast packet being received within a configured time period, the method can drop the second instance of the broadcast packet.

15 Claims, 7 Drawing Sheets

(51) Int. Cl.
*H04L 49/00* (2022.01)
*H04L 45/745* (2022.01)
*H04L 47/32* (2022.01)
*H04L 49/354* (2022.01)
*H04L 45/16* (2022.01)

(52) U.S. Cl.
CPC ............ *H04L 45/16* (2013.01); *H04L 45/745* (2013.01); *H04L 47/32* (2013.01); *H04L 49/354* (2013.01); *H04L 49/70* (2013.01)

(56) References Cited

U.S. PATENT DOCUMENTS

| | | | |
|---|---|---|---|
| 6,704,318 B1 * | 3/2004 | Stuart | .................. H04L 12/433 370/403 |
| 6,775,295 B1 | 8/2004 | Lothberg et al. | |
| 7,050,398 B1 | 5/2006 | Lee | |
| 7,185,107 B1 | 2/2007 | Cassar | |
| 9,794,169 B2 | 10/2017 | Tie et al. | |
| 10,462,013 B2 | 10/2019 | Cohn et al. | |
| 10,505,845 B2 * | 12/2019 | Jetcheva | ................. H04L 45/04 |
| 10,693,732 B2 | 6/2020 | Cohn et al. | |
| 2003/0048797 A1 | 3/2003 | Sandstrom | |
| 2006/0133286 A1 * | 6/2006 | Elie-Dit-Cosaque | ... H04L 45/00 370/249 |
| 2009/0073989 A1 * | 3/2009 | Cai | ......................... H04L 45/66 370/395.53 |
| 2011/0051644 A1 | 3/2011 | Huang | |
| 2015/0381418 A1 | 12/2015 | Fausak | |
| 2018/0026872 A1 * | 1/2018 | Manthiramoorthy | ... H04L 45/28 370/249 |
| 2018/0041398 A1 | 2/2018 | Cohn et al. | |
| 2018/0109654 A1 * | 4/2018 | Rachlin | ................. H04L 43/065 |
| 2018/0131691 A1 | 5/2018 | Sundaram P | |

OTHER PUBLICATIONS

United States Patent and Trademark Office, Office Communication dated Dec. 23, 2021 for U.S. Appl. No. 17/035,491, 10 pages.

* cited by examiner

SYSTEM AND METHOD FOR PREVENTING SWITCH LOOPS IN LAYER-2 NETWORKS

CLAIM OF PRIORITY

This application claims the benefit of priority to U.S. Provisional Patent Application entitled "SYSTEM AND METHOD FOR PREVENTING SWITCH LOOPS IN LAYER-2 NETWORKS", Application No. 62/938,798, filed on Nov. 21, 2019, which application is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to computer networks. More particularly, the present disclosure relates to preventing switch loops in computer networks, such as Layer-2 networks.

BACKGROUND

A computer network provides connectivity among a set of nodes. The set of nodes are connected by a set of links (physical or virtual). The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Each node performs one or more functions, such as but not limited to routing data, filtering data, inspecting data, processing data, and/or storing data. Each nodes may be implemented by a function-specific hardware device and/or a generic machine.

Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

Ethernet transparent bridges as defined in 802.1D (i.e., IEEE 802.1D which is the IEEE MAC Bridges standard which includes Bridging, Spanning Tree and others) do not cope with redundancies in the network topology. Such redundancy create so called "switch loops", where packets traverse the same set of bridges endlessly, eventually overloading the network, and preventing it from carrying customer traffic.

A family of protocols implementing the Spanning Tree algorithm (STP, RSTP, MSTP) have been defined to cope with such loops by means of (1) detecting loops with the use of STP-specific packets (BPDUs), and (2) disabling packet forwarding on some of the ports, thereby eliminating loops, as well as the redundant paths.

SUMMARY

Described herein are systems and methods for preventing switch loops in a layer 2 network. A method can provide, at a computer including a microprocessor, two or more virtual local area networks (VLANs), each VLAN comprising a number of bridges, a plurality of end nodes connected to the two or more VLANs via a plurality of network interface cards (NICs). The method can connect two of the plurality of nodes to two of the VLANs via two or more tunnels. The method can receive a first instance of a broadcast packet at a bridge of a VLAN, and then receive a second instance of the broadcast packet is the bridge of the VLAN. Upon the second instance of the broadcast packet being received within a configured time period, the method can drop the second instance of the broadcast packet.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

In accordance with an embodiment, a computer network is implemented in accordance with a virtual topology that is instantiated on a physical topology. A physical topology can comprise a particular arrangement of digital devices, such as function-specific hardware devices and/or generic machines.

In accordance with an embodiment, a virtual topology is a particular arrangement of virtual topology entities (VTEs). Each VTE is associated with one or more functions. Examples of functions include data routing, data filtering, data inspection, data storage, and/or any other type of data processing function. In accordance with an embodiment, a virtual topology can be instantiated on a physical topology based on a virtual topology specification. During instantiation, VTEs of a virtual topology specification are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

In accordance with an embodiment, multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

Figure 1:
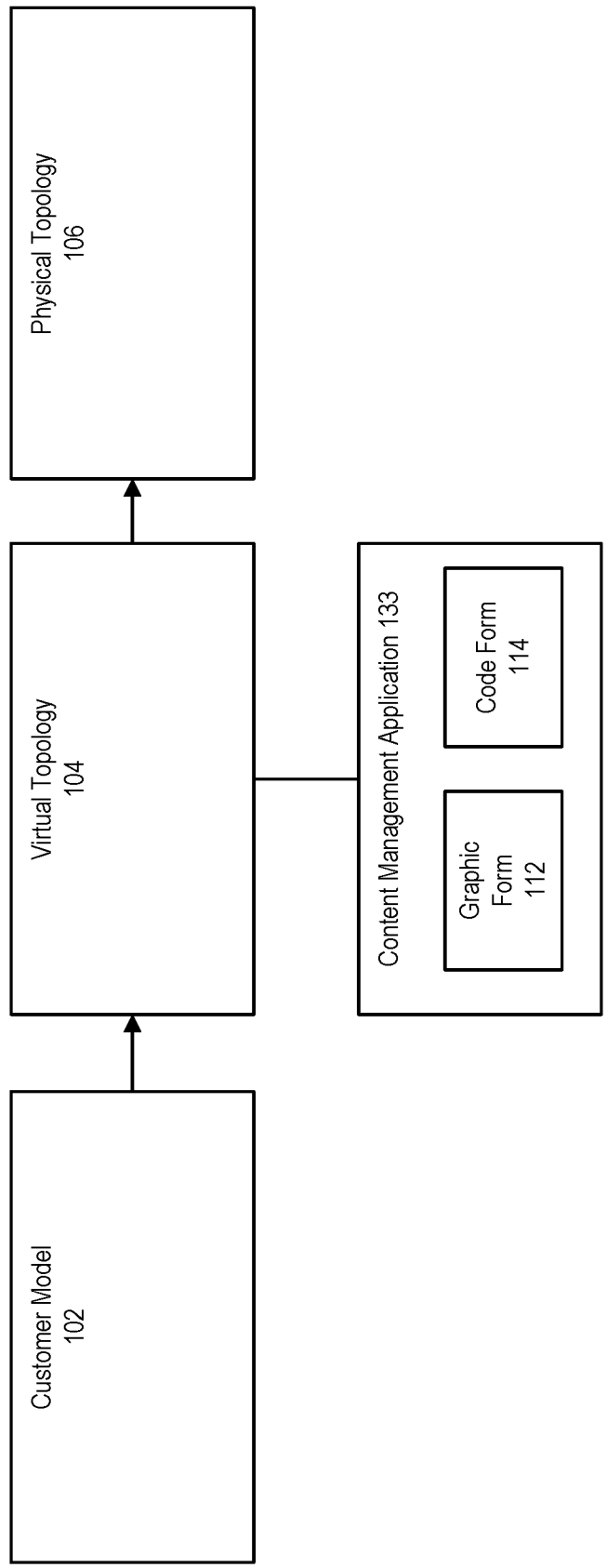
FIG. 1 illustrates relationships between a customer model, a virtual topology, and a physical topology, in accordance with an embodiment.

FIG. 1 illustrates relationships between a customer model 102, a virtual topology 104, and a physical topology 106, in accordance with an embodiment.

In accordance with an embodiment, physical topology 106 includes a particular arrangement of digital devices of a computer network. Digital devices include function-specific hardware devices and/or generic machines. An example of physical topology 106 is discussed below with reference to FIG. 3.

In accordance with an embodiment, the term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

In accordance with an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

In accordance with an embodiment, additionally, the digital devices of a physical topology 106 form a computer network that is shared amongst multiple tenants. Different tenants may demand different network requirements for the computer network. Examples of network requirements include processing speed, amount of data storage, security requirements, performance requirements, throughput requirements, latency requirements, resiliency requirements, Quality of Service (QoS) emulating performance of functions by two VTEs may decrease a TTL value of the data by two requirements, and/or tenant isolation.

In accordance with an embodiment, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals.

In accordance with an embodiment, a customer model 102 may include an arrangement of digital devices that is unnecessarily duplicative and/or inefficient. The efficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In accordance with an embodiment, a customer may request implementation of a customer model 102 on a multi-tenant computer network. Implementation of the customer model 102 may include migrating a computer network already implemented by the customer onto the multi-tenant computer network. However, the customer model 102 may have no relationship to the physical topology 106 of the multi-tenant computer network. The customer model 102 and the physical topology 106 of the multi-tenant computer network may include different components and/or a different arrangement of the components. A customer model 102 may be used to determine a virtual topology specification 105, which is used to instantiate with a virtual topology 104 on a physical topology 106.

In accordance with an embodiment, a virtual topology 104 includes a particular arrangement of virtual topology entities (VTEs). Each VTE is associated with one or more functions. The function may be implemented in order to satisfy network requirements and/or improve security, resiliency, and/or performance levels. Examples of functions performed by VTEs include but are not limited to the ability to:

(a) Routing and/or forwarding data to a next hop;
(b) Filtering and/or rejecting data based on a criterion;
(c) Inspecting data for security issues and/or other issues;
(d) Hiding and/or modifying a source address and/or destination address of data;
(e) Distributing data to resources based on availability of resources;
(f) Compressing data;
(g) Caching data;
(h) Storing data; and
(i) Processing data.

In accordance with an embodiment, a VTE associated with a particular function may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

In accordance with an embodiment, virtual topology specification 105 is a description of a virtual topology 104. A virtual topology specification 105 describes the functions of each VTE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114. A graphic form 112 of a virtual topology specification 105 may include a graph of the VTEs, such as the graph illustrated in FIG. 2. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

In accordance with an embodiment, a code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), YAML, Java, C++, C, C#, and Python.

In accordance with an embodiment, a virtual topology specification 105 includes a description of one or more forwarding policies. A forwarding policy specifies reachability between VTEs. The forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

In accordance with an embodiment, a virtual topology 104 may be instantiated on physical topology 106. During instantiation, VTEs of the virtual topology are mapped to digital devices of the physical topologies. A single VTE may be mapped to multiple digital devices. Conversely, multiple VTEs may be mapped to a single digital device. A particular digital device mapped to a particular VTE implements the functions corresponding to the particular VTE.

Figure 2:
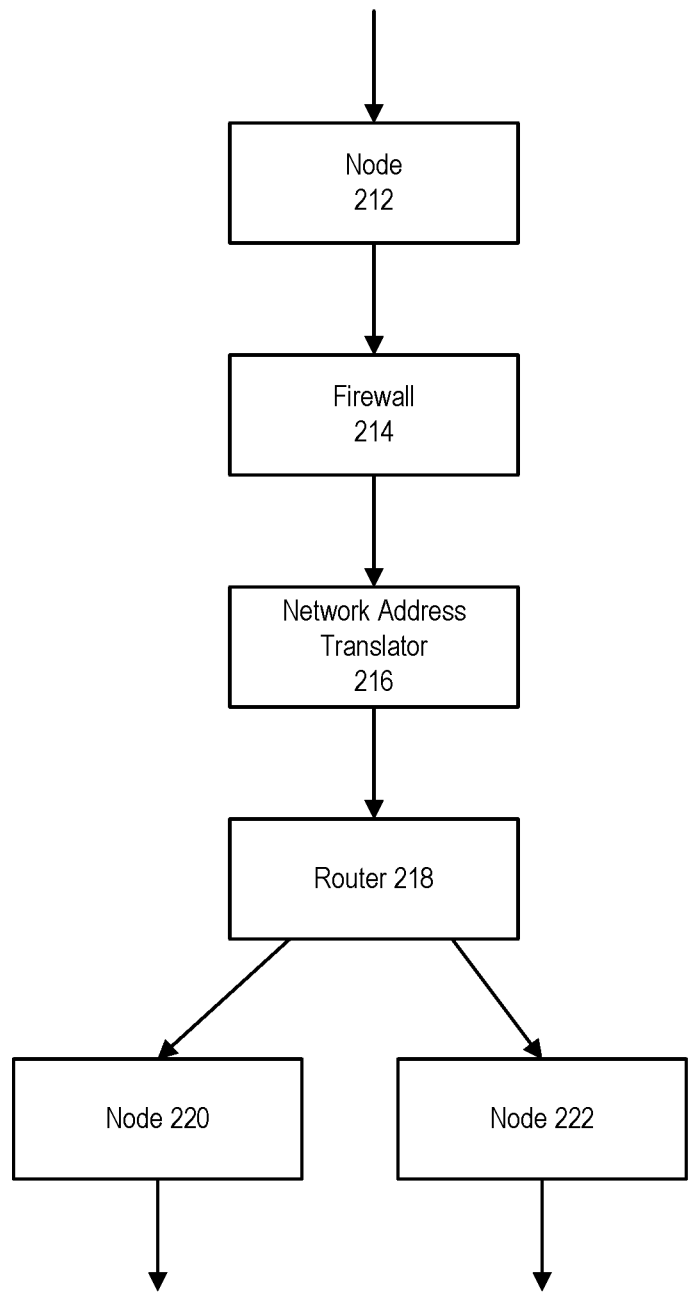
FIG. 2 illustrates an example of a virtual topology specification, in accordance with an embodiment.

In accordance with an embodiment, multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies FIG. 2 illustrates an example of a virtual topology specification, in accordance with an embodiment.

In accordance with an embodiment, a virtual topology specification 200 includes various VTEs, including node 212, firewall 214, network address translator (NAT) 216, router 218, node 220, and node 222. Virtual topology specification 200 may include more or fewer VTEs than the VTEs illustrated in FIG. 2. Each VTE is represented as a box. A connection between the VTEs is represented by a line.

In accordance with an embodiment, virtual topology specification 200 may be generated by a user submitting user input via a user interface. As an example, the user may be a representative of a customer (e.g., company with data being stored/processed by a cloud network), or a representative of a third party company implementing the computer network. The user may drag and-drop a VTE to a particular location on a graph presented by the user interface. The user may label the VTE as "node 212." The user may drop-and-drop another VTE to another location on the graph. The user may label the VTE as "firewall 214." The user may add a line connecting node 212 and firewall 214. The user may further specify the functions performed by node 212 and firewall 214.

In accordance with an embodiment, example virtual topology specification 200 specifies how data is supposed to traverse through the VTEs. Data is supposed to traverse through the VTEs according to the connections linking the VTEs. As illustrated, for example, data may be transmitted from node 212 to node 220 by traversing through firewall 214, NAT 216, and router 218. At firewall 214, the data may be processed to perform a firewall functionality associated with firewall 214. Based on the firewall functionality, the data may be inspected to determine whether to allow the data to pass through. Additionally, at NAT 216, the data may be processed to perform a NAT functionality associated with NAT 216. Based on the NAT functionality, the source address and/or destination address of the data may be modified. Additionally, at router 218, the data may be processed to perform the routing functionality of router 218. Based on the routing functionality, the next hop of the data may be identified as node 220. Router 218 may forward the data to node 220.

Figure 3:
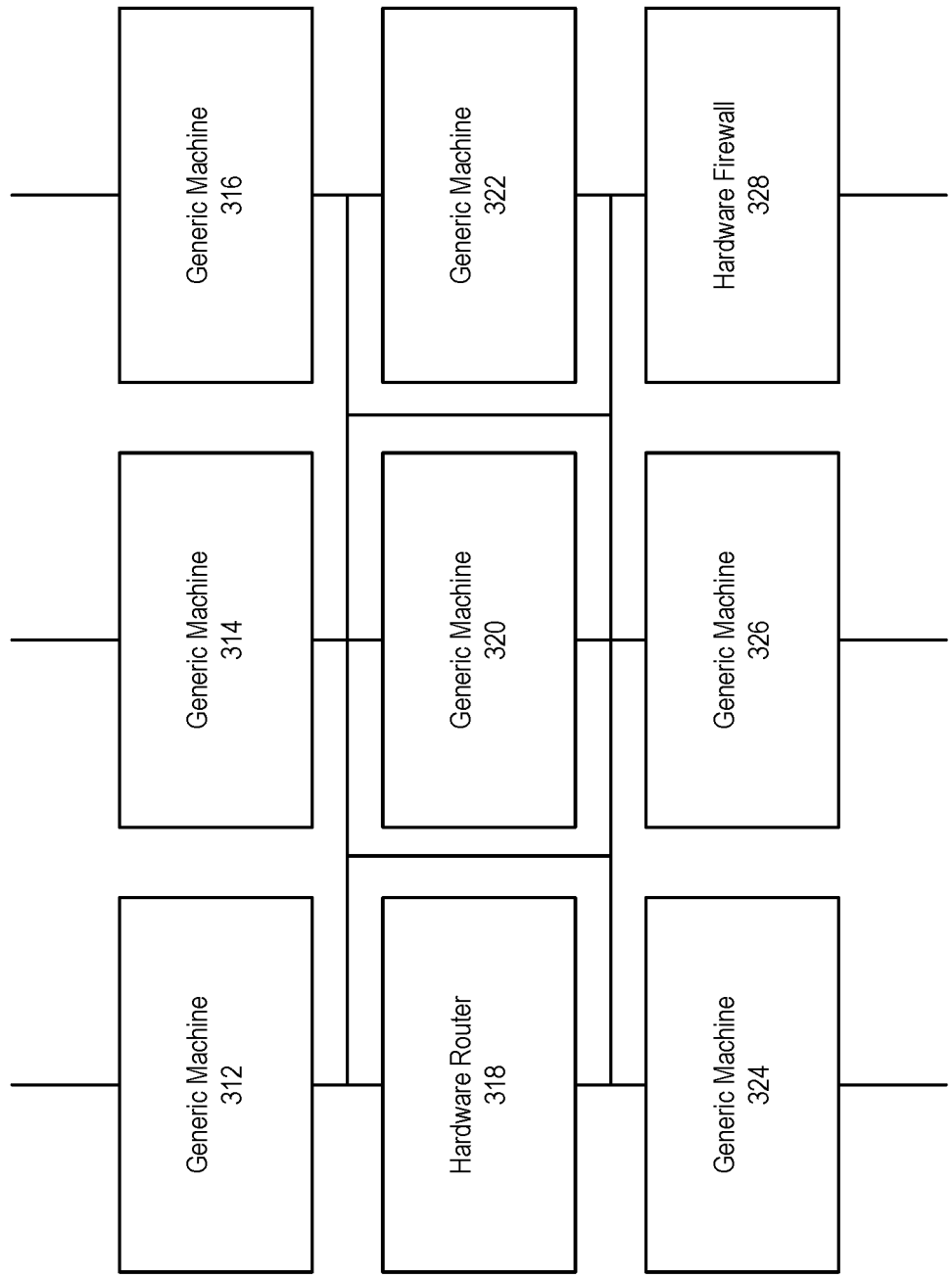
FIG. 3 illustrates an example of a physical topology, in accordance with an embodiment.

FIG. 3 illustrates an example of a physical topology, in accordance with an embodiment.

In accordance with an embodiment, physical topology 300 includes various digital devices, including generic machines 312-316 and 320-326, hardware router 318, and hardware firewall 328. Physical topology 300 may include more or fewer digital devices than the digital devices illustrated in FIG. 3. Each digital device is represented as a box. Each digital device may be connected to any number of one or more other digital devices within physical topology 300. The digital devices may be located in a single geographical location or distributed across various geographical locations.

In accordance with an embodiment, physical topology 300 may correspond to a cloud network. The digital devices shown in physical topology 300 may be shared amongst multiple client devices and/or tenants. A particular digital device may perform a same function for different client devices and/or tenants. A particular digital device may perform different functions for different client devices and/or tenants.

In accordance with an embodiment, there are multiple ways to instantiate a virtual topology, described by a same virtual topology specification, on a physical topology. Instantiation of a virtual topology on a physical topology 300 includes mapping VTEs described in a virtual topology specification to digital devices of the physical topology 300.

In accordance with an embodiment, VTEs in a virtual topology may be executed in an overlay network. The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally or alternatively, the addresses may be dynamically assigned (for example, by a Dynamic Host Configuration Protocol (DHCP) and/or another application). Data is transmitted between VTEs in a virtual topology by tunneling through the underlying network.

Protecting Against Switch Loops

As mentioned above, Ethernet transparent bridges, such as those defined in 802.1D, do not cope with redundancies in the network topology. Such redundancy create so called "switch loops", where packets traverse the same set of bridges endlessly, eventually overloading the network, and preventing it from carrying customer traffic. A family of protocols implementing the Spanning Tree algorithm (STP, RSTP, MSTP) have been defined to cope with such loops by means of (1) detecting loops with the use of STP-specific packets (BPDUs), and (2) disabling packet forwarding on some of the ports, thereby eliminating loops, as well as the redundant paths. However, such implementations disable ports, which is undesirable.

In accordance with an embodiment, the below pseudo describes a standard Ethernet bridge:

```
function learn(packet, fwdb) {
    smac = packet.ethernet.source_mac;
    sport = packet.rx_port;
    found = fwdb_locate(fwdb. mac, &index);
    if (!found) {
        fwdb_create(fwdb, mac = amac, port = sport, age=0);
    } else {
        fwdb[index].port = sport;
        fwdb[index].age = 0;
    }
}
function route(packet, fwdb) returns port {
    dmac = packet.ethernet.dest_mac;
    found = fwdb_locate(fwdb. mac, &index);
    if (!found) return None;
    if (fwdb[index].age > time_expire) return None;
    return fwdb[index].port;
}
function bridge(packet, fwdb) {
    learn(packet, fwdb);
    d_port = route(packet, fwdb);
    s_port = packet.rx_port;
    if (d_port == None) {
        for (d_port in all_ports) {
            if (d_port != s_port)
                transmit(packet, d_port);
        }
    } else if (d_port != s_port)
        transmit(packet, d_port);
    }
    discard(packet);
}
```

In accordance with an embodiment, the systems and methods described herein do not disable ports, and does not eliminate redundant links, and hence does not preclude reliability and performance benefits that redundancy offers. The systems and methods do no employ complex mathematical graph algorithms, which are known to suffer from scalability issues, and frequently are misconfigured. STP also requires to be deployed at all bridges on a network to be effective.

In accordance with an embodiment, the systems and methods herein work each bridge independently of all other bridges in, for example, a Layer-2 domain (a.k.a. VLAN), and does not require all bridges of the network to implement the same mechanism in order to be effective. In addition, the systems and methods described herein can be used on physical (e.g., non-virtualized) networks as well.

Figure 4:
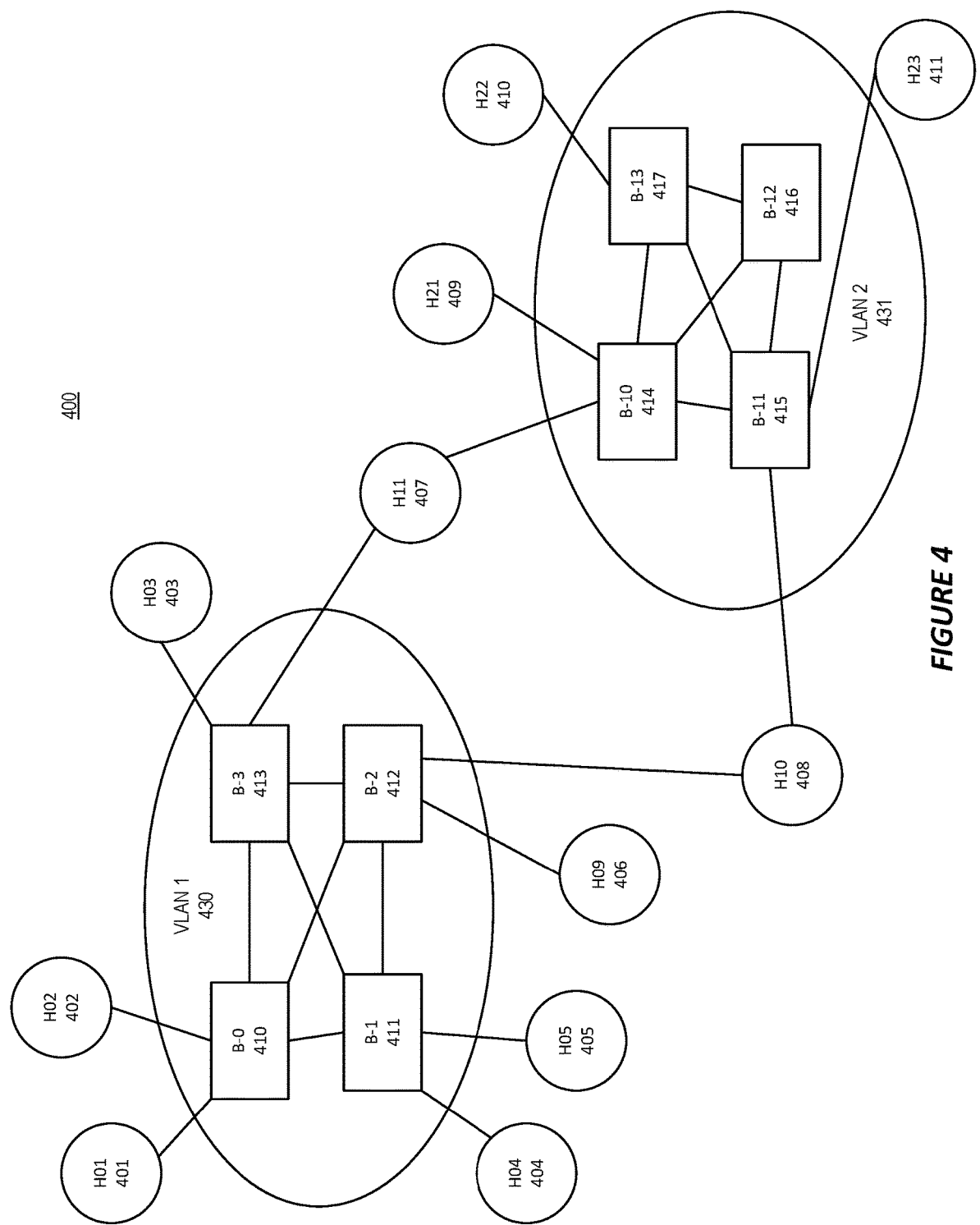
FIG. 4 shows a multiple VLAN topology that suffers from switch loops, in accordance with an embodiment.

FIG. 4 shows a multiple VLAN topology that suffers from switch loops, in accordance with an embodiment.

In accordance with an embodiment, the multiple VLAN topology 400 can comprise a number of VLANs, such as VLAN1 430 and VLAN 2 431. Each VLAN can comprise a number of bridges, such as B-0 through B03, 410-413 within VLAN 1, and B10-B13 414-417 within VLAN 2. A number of instances (e.g., NICs, SmartNICs, or end points) H01 401, H02 402, H03 403, H04 404, H05 405, H09 406, H10 408, H11 407, H21 409, H22 410, and H23 411 can be interconnected via the VLANs. In addition, certain instances, such as H10 and H11, can act as bridges, or virtual bridges, (e.g., Ethernet transparent bridges) between multiple VLANs. The instances can serve as connection points for, e.g., customer virtual machines, to connect to the VLANs, and can comprise layer-2 VNICs (virtual network interface cards).

In accordance with an embodiment, in the example depicted in FIG. 4, all virtual bridges are connected to each other in a full mesh with tunnels that carry traffic over the physical network between VNICs. A bridge/switch loop can present when, for example, H10 sends a packet, e.g., an address resolution protocol (ARP) packet within VLAN 1, seeking the address information for H21. The packet, on arriving at B-2, is replicated and sent to H10, B-1, and B-3. H10 replicates the packet, sending it to B-11 within VLAN 2, which in turn replicates the packet and sends to B-10 and B-12. B-10 replicates the packet, sending it to H21 (the intended destination), as well as H11, which then replicates and forwards the packet back to VLAN 1, via B-3. This is a switch loop (an additional switching loop is also created by B-3 replicating and forwarding the packet along H11). Such switch loops can lead to network congestion and failure.

Figure 5:
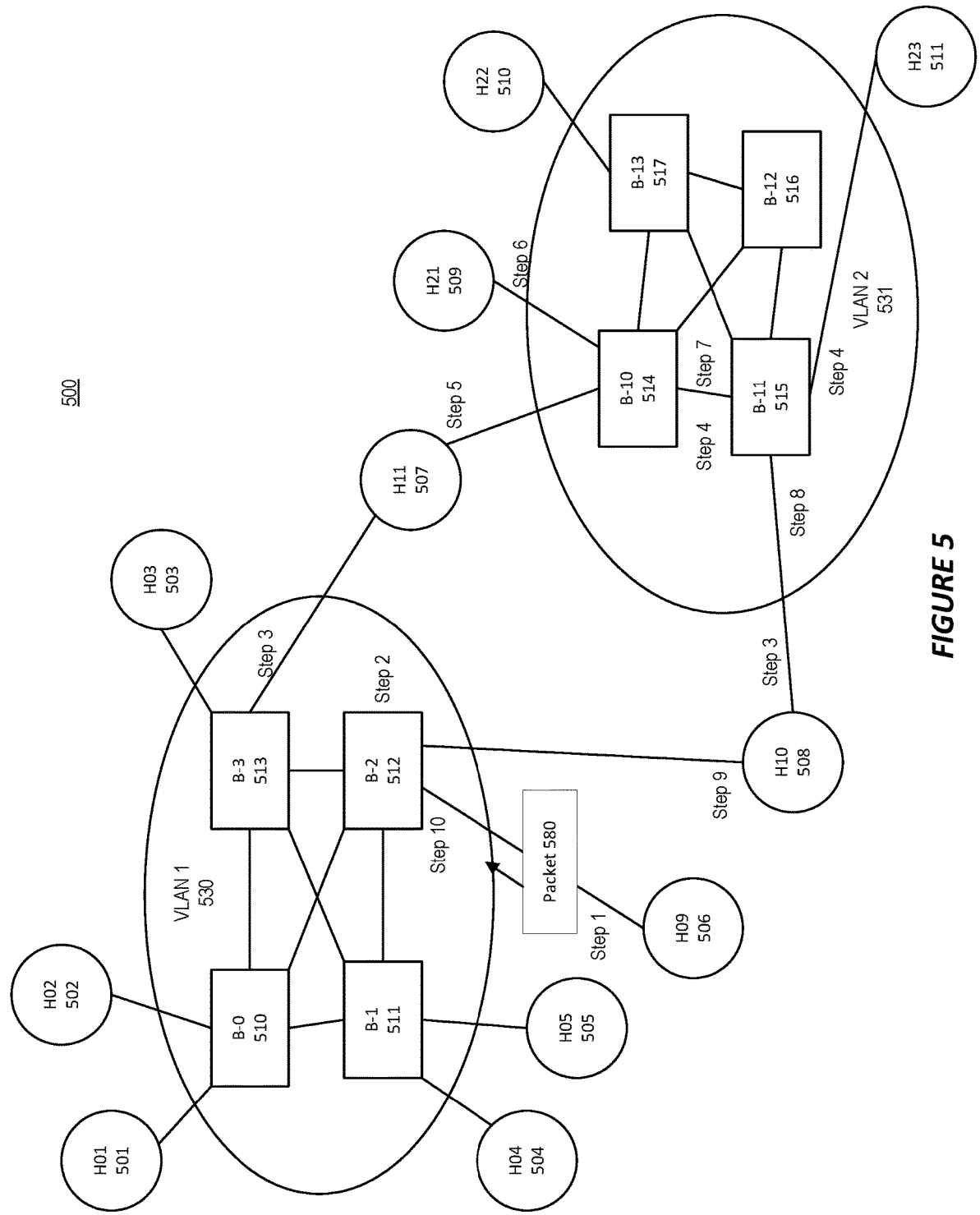
FIG. 5 shows a system for preventing switch loops in a multiple VLAN topology, in accordance with an embodiment.

FIG. 5 shows a system for preventing switch loops in a multiple VLAN topology, in accordance with an embodiment.

In accordance with an embodiment, the multiple VLAN topology 500 can comprise a number of VLANs, such as VLAN1 530 and VLAN 2 531. Each VLAN can comprise a number of bridges, such as B-0 through B03, 510-513 within VLAN 1, and B10-B13 514-517 within VLAN 2. A number of instances (e.g., NICs, SmartNICs, or end points) H01 501, H02 502, H03 503, H04 504, H05 505, H09 506, H10 508, H11 507, H21 509, H22 510, and H23 511 can be interconnected via the VLANs. In addition, certain instances, such as H10 and H11, can act as bridges, or virtual bridges, (e.g., Ethernet transparent bridges) between multiple VLANs. The instances can serve as connection points for, e.g., customer virtual machines, to connect to the VLANs, and can comprise layer-2 VNICs (virtual network interface cards).

In accordance with an embodiment, the tunnels are point-to-point connections. With a full-mesh connectivity between virtual bridges, once a packet reaches a virtual bridge, it will be sent to L2-VNICs only, and never into another tunnel, and so even though the mesh appears redundant, it does not pose a danger of creating bridge loops.

In accordance with an embodiment, the systems and methods discussed herein provides a new mechanism for transparent learning bridge, which mitigates the effects of the bridge loops, rather than prevent it outright. In other words, links and ports are not being disabled, prevented from passing useful traffic even in the presence of redundant topology. Instead the disclosed systems and methods effectively prevent packets from infinitely traversing the network (looping), by identifying and discarding packets that arrive into a bridge from a redundant path.

In accordance with an embodiment, when a packet from a specific host (instance) arrives at a bridge, the forwarding table is updated with the host's address, port and the time of its first arrival. When a packet containing the same source address arrives from a different port within a short period of time, it is assumed to have resulted from duplication and redundancy, and, the packet being a redundant copy, is grounds for discarding the packets.

In accordance with an embodiment, the aforementioned short period of time is a time interval (termed "time_persist" in the pseudo code below) which can be much longer than the time any packet is expected to be "in flight" within the network. At the same time, this interval is shorter than the network's required reaction to a host move. More specifically, within a virtualized network a host may "move", i.e. change the bridge port it is connected through during a high-availability fail-over event, and during any customer-initiated change in provisioning, the former being shorter, and thus the effective upper bound on the threshold.

In accordance with an embodiment, the below pseudo code represents a method to avoid switch loops, as described above:

```
function learn(packet, fwdb) returns Action {
    smac = packet.ethernet.source_mac;
    sport = packet.rx_port;
    found = fwdb_locate(fwdb. mac, &index);
    if (!found) {
        fwdb_create(fwdb, mac = amac, port = sport, age=0);
        return FORWARD;
    }
    if (fwdb[index].port == sport) {
        fwdb[index].age = 0;
        return FORWARD;
    }
    if (fwdb[index].age > time_persist) {
        fwdb[index].port = sport;
        fwdb[index].age = 0;
        return FORWARD;
    }
    return DROP;
}
function bridge(packet, fwdb) {
    action = learn(packet, fwdb);
    if (action == DROP) {
        discard(packet);
        Return;
    }
    d_port = route(packet, fwdb); // unchanged
    s_port = packet.rx_port;
    if (d_port == None) {
        for (d_port in all_ports) {
            if (d_port != s_port)
                transmit(packet, d_port);
        }
    } else if (d_port != s_port){
        transmit(packet, d_port);
    }
    discard(packet);
}
```

In accordance with an embodiment, within the pseudo code above, the main function is route( ) that is called with each new arriving packet, and results in zero or more invocations of transmit( ) to forward the packet, followed by a call to discard( ) which frees the packet buffers. Pseudo-code is written for simplicity and thus ignores many aspects of a real implementation including efficiency, concurrency control and omits the details of associating a port value with a location of a bridge (contained in a SmartNIC) on the physical data-center network.

In accordance with an embodiment, the following example, in conjunction with reference to FIG. 5, illustrates the systems and methods disclosed herein:

At step 1: A broadcast packet 580 (the packet comprising an identifier of the source, e.g., the source address of H09) is originated at H09 instance, (e.g., an ARP packet intended for H21). The packet is sent to B-2 on VLAN 1.

At step 2: B-2 distributes the packet to all the other bridges on the left VLAN, including B-3 and all instances other than the originator connected to it, namely H10.

At step 3: All bridges on the VLAN 1 forward the packet to all hosts connected to that VLAN, including B-3 sending the packet to H11. Concurrently, H10 functioning as a bridge, forwards the packet to B-11.

At step 4: B-11 distributes the packet to all bridges in VLAN 2, including B-10, and to the instances connected to B-11, namely H23.

At step 5: H11 functioning as a bridge, sends the packet to B-10, but B-10 has already received the packet from B-11 and has H09's address in its memory, having received the packet originating in the same address via link to B-11. The packet, arriving from H11 comprises the same source address (H09's source address), but on a different port, the H11 L2-VNIC. Using the system and method of the pseudo code above, this packet (from H11) will be recognized by B-10 as artifact of a loop, will be discarded. At the same time the remaining bridges of VLAN 2 will forward the packet received from B-11 to the remaining instances (e.g., H22).

At step 6: At this point, H21 received only one copy of the ARP broadcast as intended, and will generate an ARP response with via a unicast addressed to H09. The packet will first be send to B-10.

At step 7: B-10 has learned of H21 location in the direction of B-11, and will forward the packet only to B-11.

At step 8: B-11 learned of H21 via H10, and will forward the packet there.

At step 9: H10 sends the response to B-2.

At step 10: B-2 sends the response to H09.

In accordance with an embodiment, subsequent communications can involve routing packets based on the forwarding table contents, and every time a packet arrives in the path, the table entry age field is updated, so as long as the bidirectional stream is active, the topology learnt will persist. The bridge-loop condition is detected at step 5 above because the time that elapsed from the previous step where the location of H09 is first learned was less than a time_persist threshold.

In accordance with an embodiment, the value for the time_persist can be configurable.

In accordance with an embodiment, while the above description of the disclosed systems and methods are described in the context of a virtualized Ethernet, or a virtualized network, it would be readily understood that the disclosed systems and methods are similarly applicable to physical networks as well.

Figure 6:
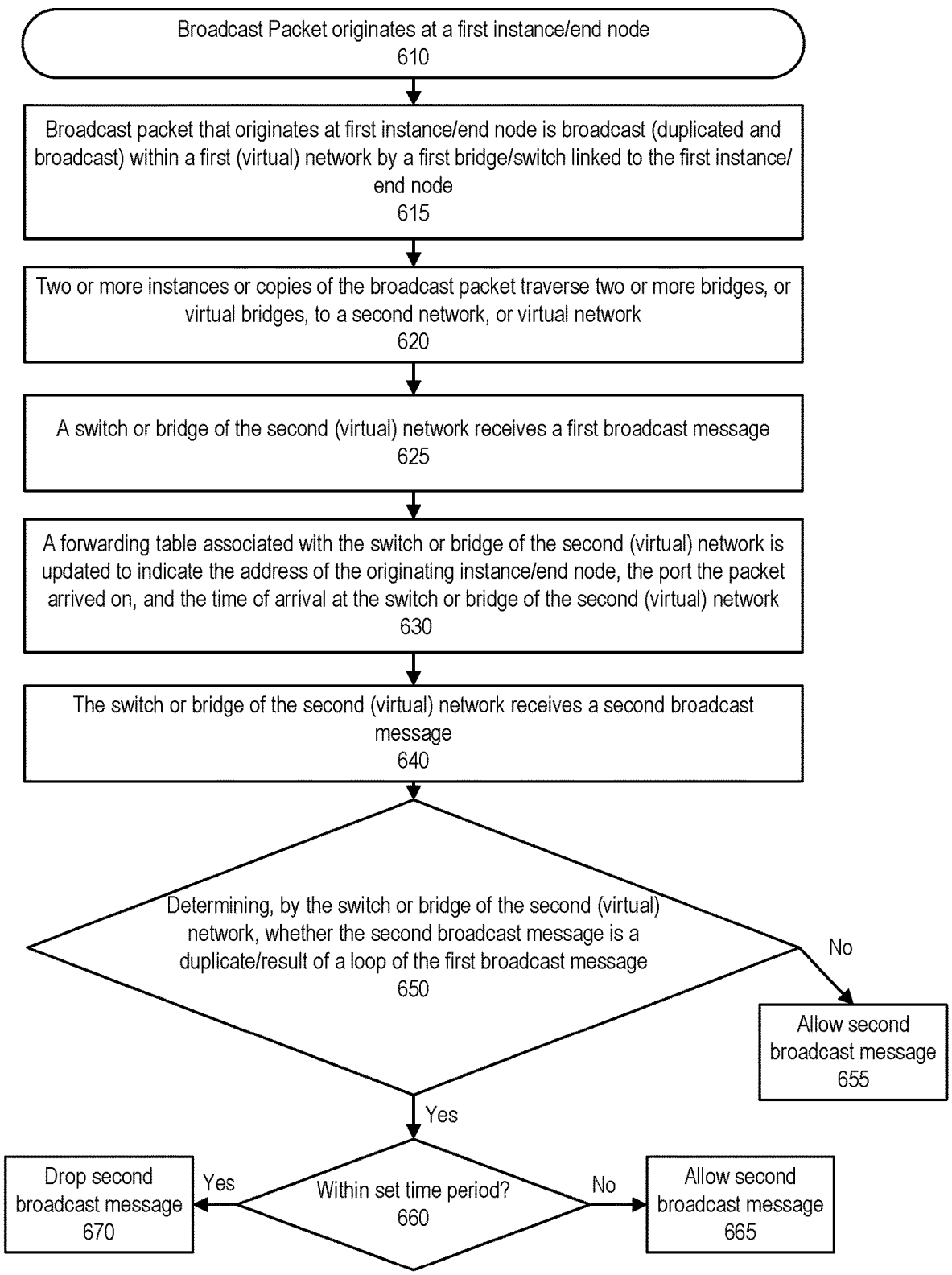
FIG. 6 shows a flow chart of a method for preventing switch loops in a multiple VLAN topology, in accordance with an embodiment.

FIG. 6 shows a flow chart of a method for preventing switch loops in a multiple VLAN topology, in accordance with an embodiment.

In accordance with an embodiment, at 610, a broadcast packet can be generated at a first instance/end node, such as a host node.

In accordance with an embodiment, at 615, the broadcast packet that originated at the first instance/end node can be broadcast within a first network (e.g., a virtual network) by a first bridge within the first network, the first bridge being linked to the first instance/end node that originated the broadcast packet.

In accordance with, when broadcasting the first broadcast packet, the first bridge can duplicate/replicate the broadcast message and send the duplicated/replicated broadcast messages out on every port/link connected to the first bridge, excluding the port/link on which the first bridge received the broadcast packet.

In accordance with an embodiment, at 620, two or more copies or instances of the broadcast packet traverse two or more bridges, of virtual bridges, to a second network, or virtual network.

In accordance with an embodiment, at 625, a switch or bridge of the second (virtual) network receives a first broadcast message.

In accordance with an embodiment, at 630, a forwarding table associated with the switch or bridge of the second (virtual) network is updated to indicate the address of the originating instance/end node that originated the broadcast packet, the port the broadcast packet arrived on, and the time of arrival at the switch or bridge of the second (virtual) network.

In accordance with an embodiment, at 640, the switch or bridge of the second (virtual) network receives a second broadcast message.

In accordance with an embodiment, at 650, the switch or bridge of the second (virtual) network determines whether the second broadcast message is a result of a loop of the first received broadcast message. This can be done, for example, by first determining whether the second received packet/message is a duplicate of the first received packet/message, and whether the second received packet/message is received at a different port of the switch or bridge of the second (virtual) network. If the message is not a duplicate/result of a loop, then at 655 the bridge or switch of the second (virtual) network can allow the second broadcast message to proceed.

In accordance with an embodiment, at 660, if it is determined that the second received broadcast message is a duplicate and a result of a loop (i.e., that the duplicate message is received on a different port), then the time the second received broadcast message is received is compared against the recorded time the first broadcast message was received to determine if the time period between the two messages being received is less than or equal to a set time period (e.g., time_persist as discussed above). If it is, then the message can be determined to be a result of a loop and the second received broadcast message can be dropped 670. If not, then the second received broadcast message can be determined to not be a result of a loop, and the second received message can be allowed 665.

Figure 7:
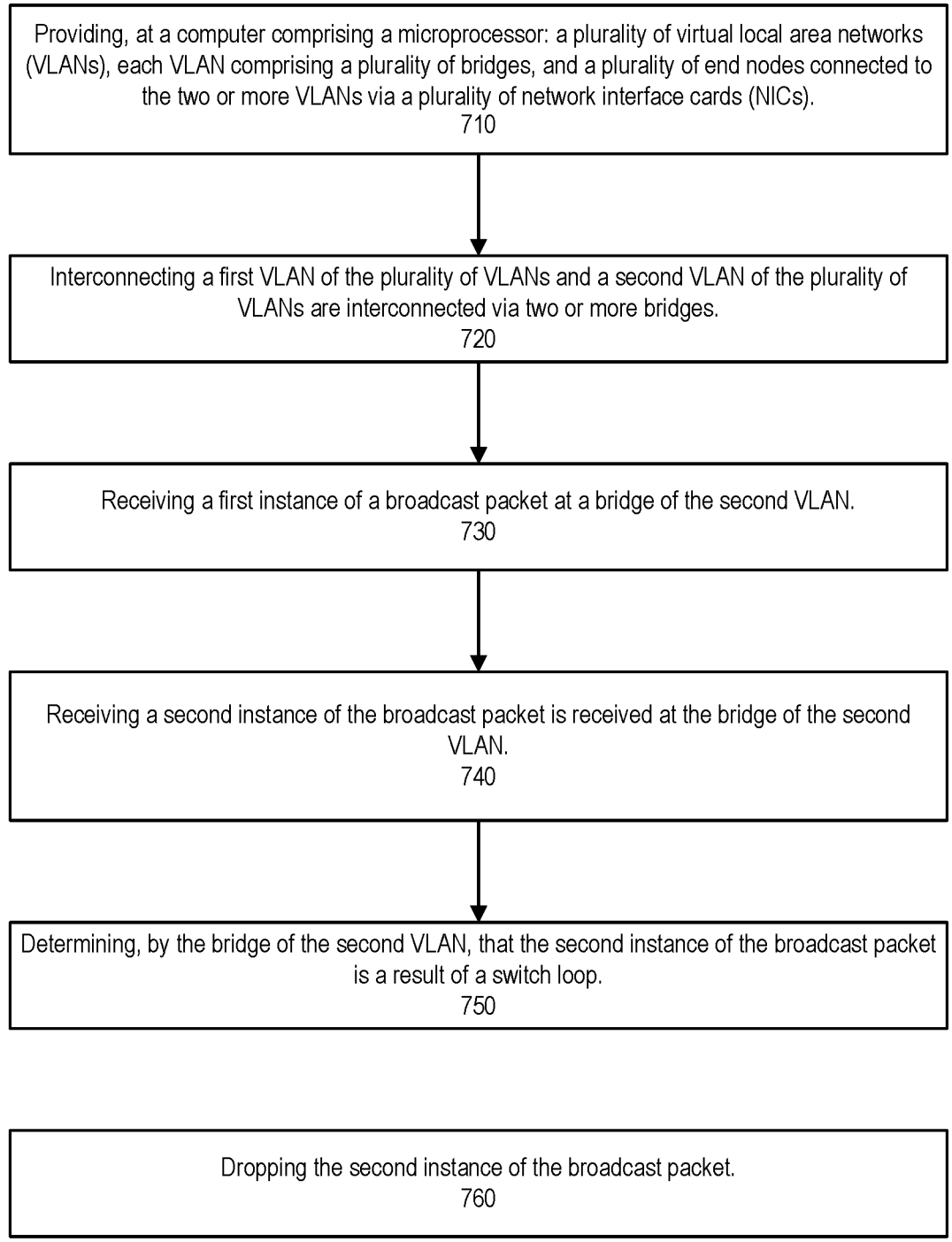
FIG. 7 is a flowchart of an exemplary method for preventing switch loops in a layer 2 network, in accordance with an embodiment.

FIG. 7 is a flowchart of an exemplary method for preventing switch loops in a layer 2 network, in accordance with an embodiment.

In accordance with an embodiment, at step 710, the method can provide, at a computer comprising a microprocessor: a plurality of virtual local area networks (VLANs), each VLAN comprising a plurality of bridges, and a plurality of end nodes connected to the two or more VLANs via a plurality of network interface cards (NICs).

In accordance with an embodiment, at step 720 the method can interconnect a first VLAN of the plurality of VLANs and a second VLAN of the plurality of VLANs are interconnected via two or more bridges.

In accordance with an embodiment, at step 730, the method can receive a first instance of a broadcast packet at a bridge of the second VLAN.

In accordance with an embodiment, at step 740 the method can receive a second instance of the broadcast packet is received at the bridge of the second VLAN.

In accordance with an embodiment, at step 750 the method can determine, by the bridge of the second VLAN, that the second instance of the broadcast packet is a result of a switch loop.

In accordance with an embodiment, at step 760 the method can drop the second instance of the broadcast packet.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/ or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/ interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, minicomputers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for preventing switch loops in a layer 2 network, comprising:
   a plurality of virtual local area networks (VLANs), each VLAN comprising a plurality of bridges; and
   a plurality of end nodes connected to the two or more VLANs via a plurality of network interface cards (NICs), the plurality of end nodes comprising a computer comprising a microprocessor;
   wherein a first VLAN of the plurality of VLANs and a second VLAN of the plurality of VLANs are interconnected via two or more virtual bridges, each virtual bridge providing a separate connection between the first VLAN and the second VLAN;
   wherein a first instance of a broadcast packet is received at a bridge of the second VLAN;
   wherein upon receiving the first instance of the broadcast packet at the bridge of the second VLAN, a forwarding table associated with the bridge of the second VLAN is updated to record a port of the bridge of the second VLAN on which the first instance of the broadcast packet was received and a time of arrival of the first instance of the broadcast packet at the bridge of the second VLAN;
   wherein a second instance of the broadcast packet is received at the bridge of the second VLAN, wherein the second instance of the broadcast packet is received at the bridge of the second VLAN after the first instance of the broadcast packet is received at the bridge of the second VLAN; and wherein the bridge of the second VLAN determines that the second instance of the broadcast packet is a result of a switch loop and drops the second instance of the broadcast packet.

2. The system of claim 1,
wherein a first virtual bridge of the two or more virtual bridges comprises a first end node of the plurality of end nodes, the first end node being connected to the first VLAN and the second VLAN.

3. The system of claim 2,
wherein a second virtual bridge of the two or more virtual bridges comprises a second end node of the plurality of end nodes, the second end node being connected to the first VLAN and the second VLAN.

4. The system of claim 1,
wherein the bridge of the second VLAN determines that the second instance of the broadcast packet is a result of a switch loop by comparing a port on which the second instance of the broadcast packet is received on to the recorded port of the bridge of the second VLAN on which the first instance of the broadcast packet was received on.

5. The system of claim 4,
wherein the bridge of the second VLAN determines mining that the port on which the second instance of the broadcast packet is received on is different than the recorded port of the bridge of the second VLAN on which the first instance of the broadcast packet was received on, the bridge of the second VLAN determines a time period between receiving the first instance of the broadcast packet and the second instance of the broadcast packet.

6. The system of claim 5,
wherein the determined time period being less than a configured time period, the bridge of the second VLAN drops the received second instance of the broadcast packet.

7. A method for preventing switch loops in a layer 2 network, comprising:
providing, at a computer comprising a microprocessor;
a plurality of virtual local area networks (VLANs), each VLAN comprising a plurality of bridges, and
a plurality of end nodes connected to the two or more VLANs via a plurality of network interface cards (NICs);
interconnecting a first VLAN of the plurality of VLANs and a second VLAN of the plurality of VLANs via two or more virtual bridges, each virtual bridge providing a separate connection between the first VLAN and the second VLAN;
receiving a first instance of a broadcast packet at a bridge of the second VLAN;
upon receiving the first instance of the broadcast packet at the bridge of the second VLAN, a forwarding table associated with the bridge of the second VLAN is updated to record a port of the bridge of the second VLAN on which the first instance of the broadcast packet was received and a time of arrival of the first instance of the broadcast packet at the bridge of the second VLAN;
receiving a second instance of the broadcast packet is received at the bridge of the second VLAN, wherein the second instance of the broadcast packet is received at the bridge of the second VLAN after the first instance of the broadcast packet is received at the bridge of the second VLAN;
determining, by the bridge of the second VLAN, that the second instance of the broadcast packet is a result of a switch loop; and
dropping the second instance of the broadcast packet.

8. The method of claim 7,
wherein a first virtual bridge of the two or more virtual bridges comprises a first end node of the plurality of end nodes, the first end node being connected to the first VLAN and the second VLAN.

9. The method of claim 8,
wherein a second virtual bridge of the two or more virtual bridges comprises a second end node of the plurality of end nodes, the second end node being connected to the first VLAN and the second VLAN.

10. The method of claim 7,
wherein the bridge of the second VLAN determines that the second instance of the broadcast packet is a result of a switch loop by comparing a port on which the second instance of the broadcast packet is received on to the recorded port of the bridge of the second VLAN on which the first instance of the broadcast packet was received on.

11. The method of claim 10,
wherein the bridge of the second VLAN, upon determining that the port on which the second instance of the broadcast packet is received on is different than the recorded port of the bridge of the second VLAN on which the first instance of the broadcast packet was received on, the bridge of the second VLAN determines a time period between receiving the first instance of the broadcast packet and the second instance of the broadcast packet.

12. The method of claim 11,
wherein the determined time period being less than a configured time period, the bridge of the second VLAN drops the received second instance of the broadcast packet.

13. A non-transitory computer readable storage medium having instructions thereon for preventing switch loops in a layer 2 network, which when read an executed cause a computer to perform steps comprising:
providing, at a computer comprising a microprocessor;
a plurality of virtual local area networks (VLANs), each VLAN comprising a plurality of bridges, and
a plurality of end nodes connected to the two or more VLANs via a plurality of network interface cards (NICs);
interconnecting a first VLAN of the plurality of VLANs and a second VLAN of the plurality of VLANs via two or more virtual bridges, each virtual bridge providing a separate connection between the first VLAN and the second VLAN;
receiving a first instance of a broadcast packet at a bridge of the second VLAN;
upon receiving the first instance of the broadcast packet at the bridge of the second VLAN, a forwarding table associated with the bridge of the second VLAN is updated to record a port of the bridge of the second VLAN on which the first instance of the broadcast packet was received and a time of arrival of the first instance of the broadcast packet at the bridge of the second VLAN;
receiving a second instance of the broadcast packet is received at the bridge of the second VLAN, wherein the second instance of the broadcast packet is received at the bridge of the second VLAN after the first instance of the broadcast packet is received at the bridge of the second VLAN;

determining, by the bridge of the second VLAN, that the second instance of the broadcast packet is a result of a switch loop; and dropping the second instance of the broadcast packet.

14. The non-transitory computer readable storage medium of claim 13, wherein a first virtual bridge of the two or more virtual bridges comprises a first end node of the plurality of end nodes, the first end node being connected to the first VLAN and the second VLAN; and wherein a second virtual bridge of the two or more virtual bridges comprises a second end node of the plurality of end nodes, the second end node being connected to the first VLAN and the second VLAN.

15. The non-transitory computer readable storage medium of claim 13, wherein the bridge of the second VLAN determines that the second instance of the broadcast packet is a result of a switch loop by comparing a port on which the second instance of the broadcast packet is received on to the recorded port of the bridge of the second VLAN on which the first instance of the broadcast packet was received on;

wherein the bridge of the second VLAN, upon determining that the port on which the second instance of the broadcast packet is received on is different than the recorded port of the bridge of the second VLAN on which the first instance of the broadcast packet was received on, the bridge of the second VLAN determines a time period between receiving the first instance of the broadcast packet and the second instance of the broadcast packet; and wherein the determined time period being less than a configured time period, the bridge of the second VLAN drops the received second instance of the broadcast packet.

* * * * *

UNITED STATES PATENT AND TRADEMARK OFFICE
CERTIFICATE OF CORRECTION

PATENT NO. : 11,444,804 B2
APPLICATION NO. : 16/868368
DATED : September 13, 2022
INVENTOR(S) : Leonid Rozenboim It is certified that error appears in the above-identified patent and that said Letters Patent is hereby corrected as shown below:

In the Specification

In Column 5, Line 61, delete "topologies" and insert -- topologies. --, therefor.

In the Claims

In Column 15, Line 29, in Claim 5, before "that" delete "mining", therefor.

Signed and Sealed this
Fourteenth Day of February, 2023

Katherine Kelly Vidal
*Director of the United States Patent and Trademark Office*